Sept. 12, 1950     C. W. ROEN     2,521,949
MANUFACTURE OF MERCURIC OXIDE
Filed March 9, 1948     3 Sheets-Sheet 1
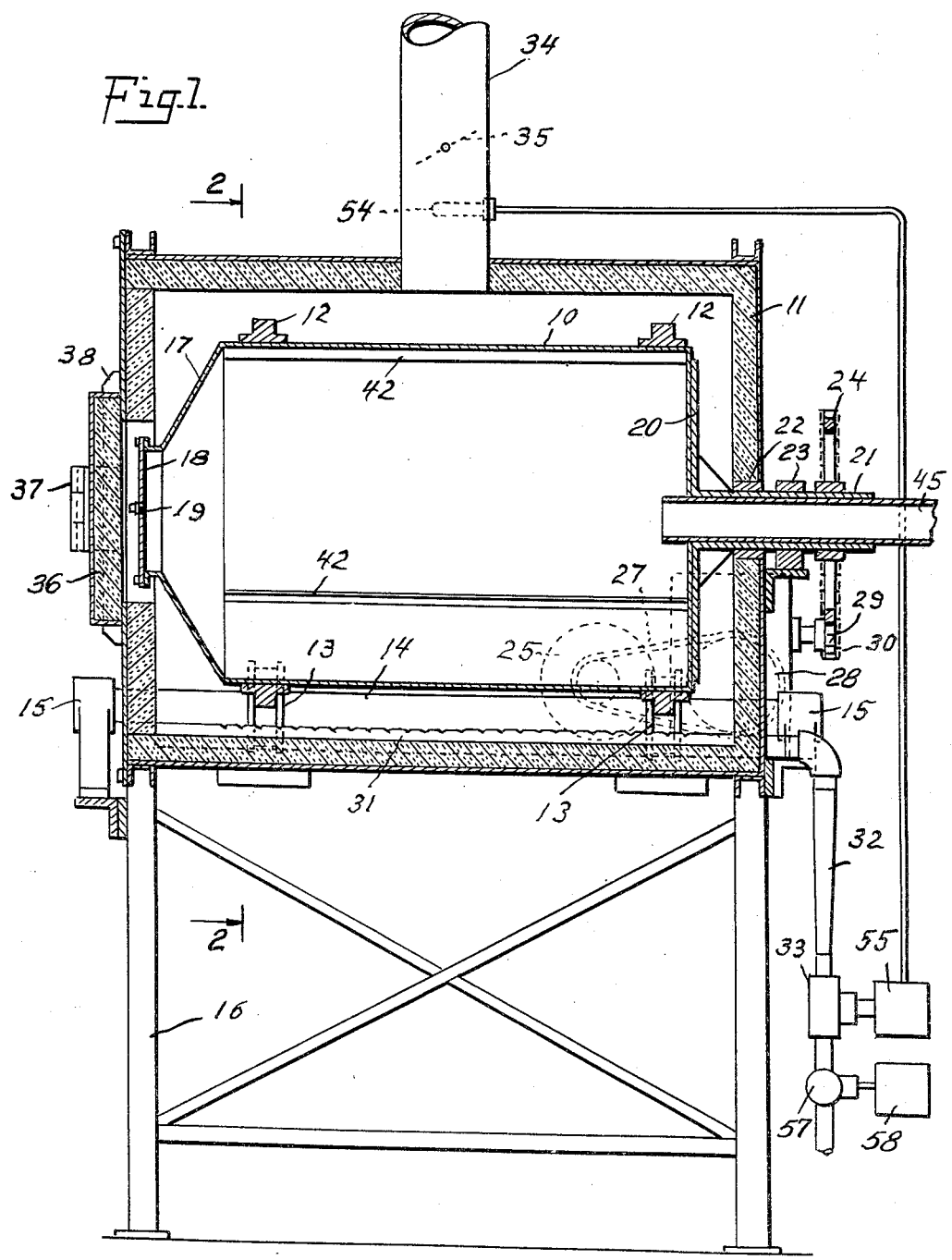
INVENTOR
Clarence W. Roen,
BY Pennie, Edmonds, Morton & Barrows
ATTORNEYS Sept. 12, 1950  C. W. ROEN  2,521,949
MANUFACTURE OF MERCURIC OXIDE
Filed March 9, 1948  3 Sheets-Sheet 2
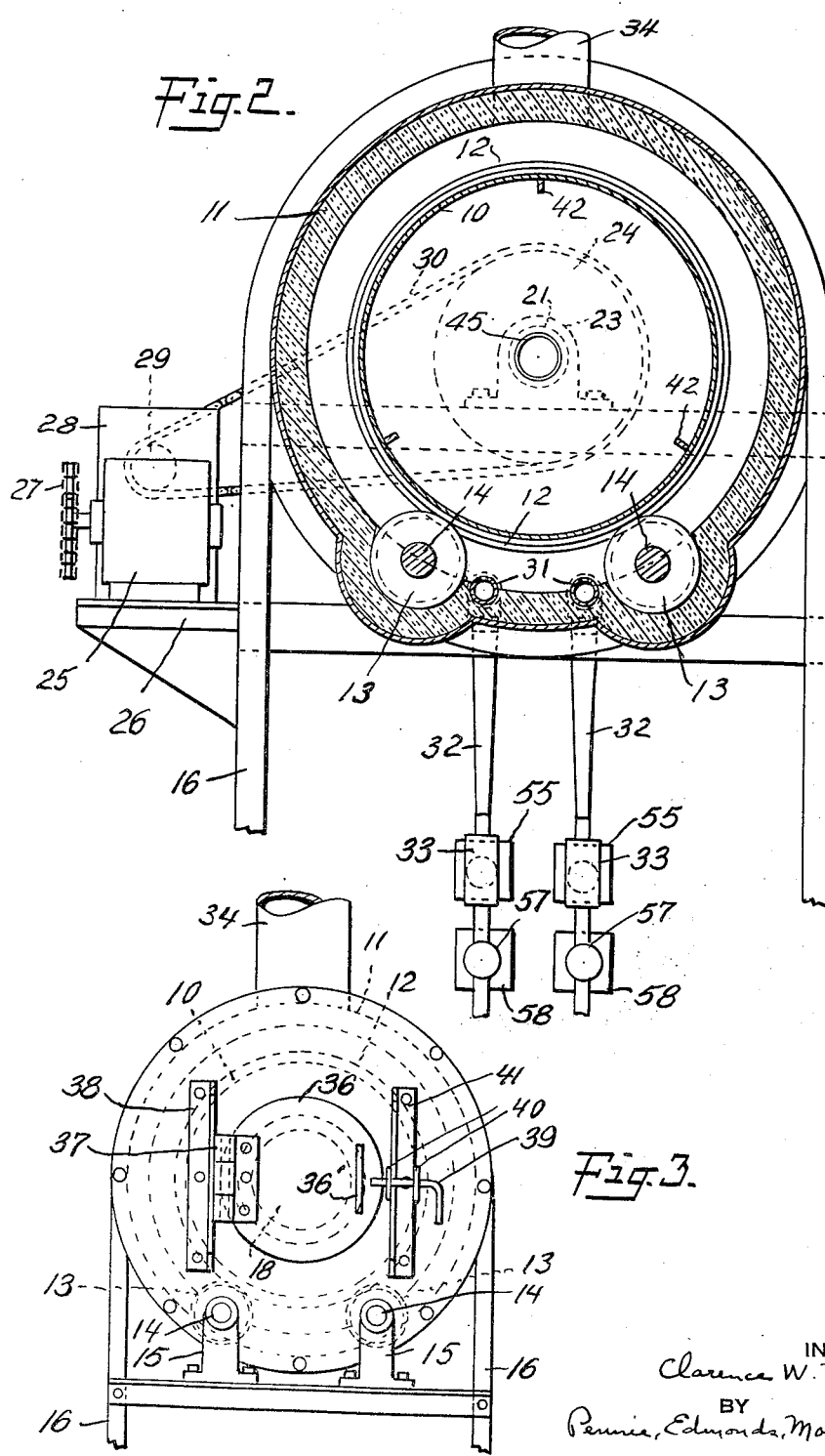
INVENTOR
Clarence W. Roen,
BY
Pennie, Edmonds, Morton & Barrows
ATTORNEYS

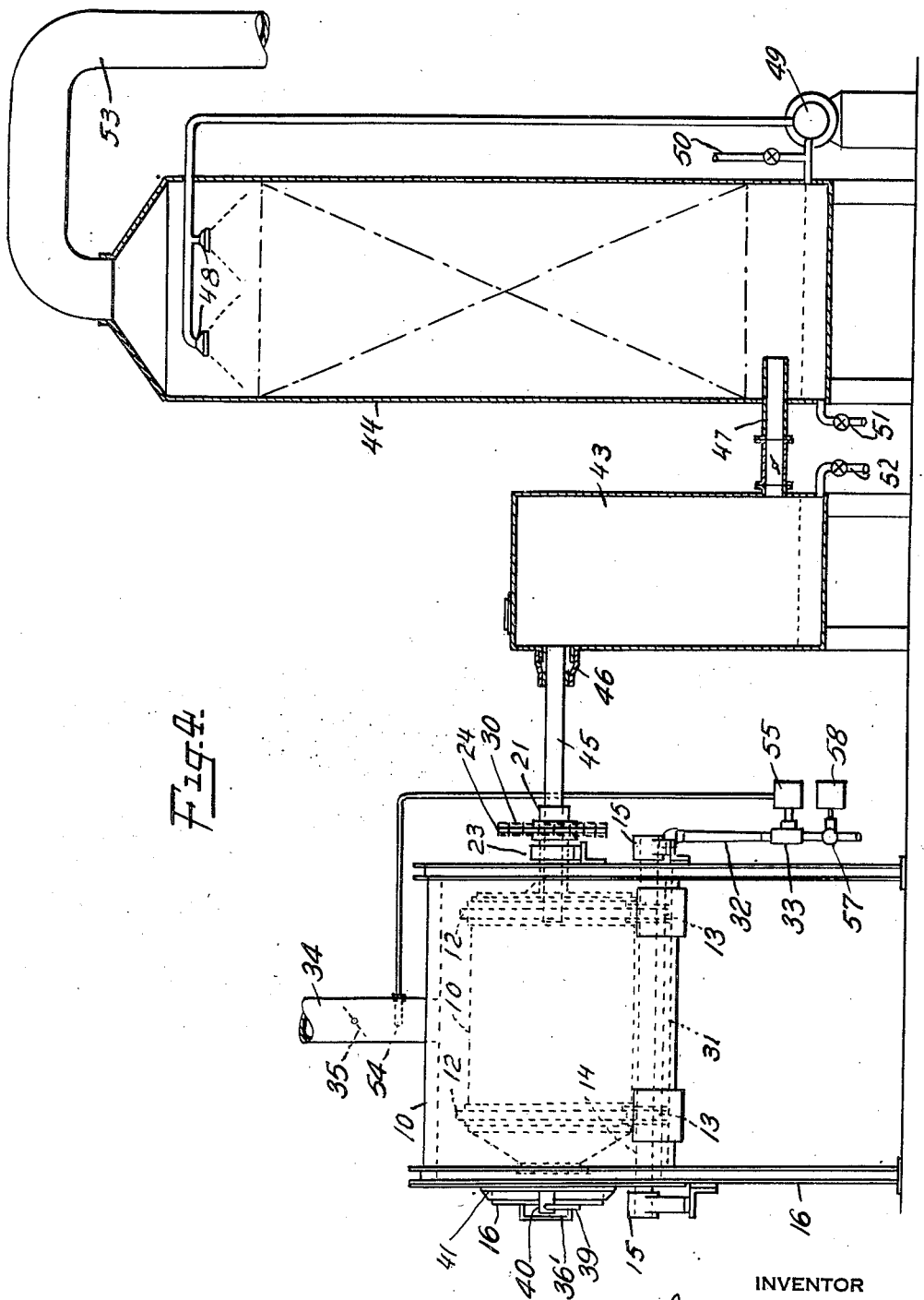

Patented Sept. 12, 1950

2,521,949

UNITED STATES PATENT OFFICE 2,521,949

MANUFACTURE OF MERCURIC OXIDE

Clarence W. Roen, El Cerrito, Calif., assignor to Precision Chemical Corporation, New York, N. Y., a corporation of California Application March 9, 1948, Serial No. 13,817

4 Claims. (Cl. 23—183)

This invention relates to the manufacture of mercuric oxide, better known commercially as red oxide of mercury, and has for its object the provision of certain improvements in its manufacture.

Mercuric oxide has heretofore been made by reacting elemental mercury with nitric acid to form nitrate of mercury, and converting the resulting nitrate to mercuric oxide by heat treatment. The process has been customarily carried out in two stages, as follows:

*1st stage.*—Acid and mercury were added in calculated quantities to an open pot, and allowed to react, with stirring. The reaction period was several hours, and the nitrate reaction product was in the form of a hard cake that had to be broken up and crushed for subsequent handling and treatment.

*2nd stage.*—The crushed nitrate was then heated or calcined at a temperature of about 300–350° C. until the evolution of nitrogen oxides ceased and a hard cake of mercuric oxide was obtained. This cake had to be broken up by hand and crushed, and then ground to the desired fineness of the finished product.

Both stages were conducted in pots and no recovery of nitrogen oxide was attempted, and the loss of mercury was substantial. The time involved in carrying out the complete process was usually in excess of 24 hours.

The method of the invention is in effect a one stage operation in which there is substantially no loss of mercury, and which can be carried out in a very substantially shorter time than heretofore. In accordance with the invention, the nitric acid and mercury in stoichiometrical proportions to form mercurous nitrate are reacted in a rotating drum. The mercury is added to the nitric acid, in the drum, in small lots to avoid too violent initial reaction. As the mercurous nitrate forms it sticks and adheres to the interior cylindrical wall of the drum, and ultimately the wall is coated with a layer of the resulting mercurous nitrate reaction product. The drum is then heated, while continuing the rotation, and the mercurous nitrate is converted in situ to mercuric oxide. The entire process is carried out in the same rotating drum in a time interval of from 3½ to 4½ hours, without the necessity of any intermediate crushing or grinding of the mercurous nitrate. Moreover, the gases evolved in both the nitrating step and in the subsequent conversion step are recovered, resulting in the reclaiming of nitric acid and the recovery of volatilized mercury.

The foregoing and other novel features of the invention will be better understood from the following description taken in conjunction with the accompanying drawings, in which Fig. 1 is a side elevation, partly in section, of a rotatable drum structure in which the method of the invention may be advantageously practiced, Fig. 2 is a sectional elevation on the section line 2—2 of Fig. 1, Fig. 3 is an end elevation of the structure, Fig. 4 is a side elevation of an apparatus, embodying the rotatable drum, for practicing the invention in its entirety.

A rotatable drum 10, of stainless steel or the like, is mounted within an insulated cylindrical body or housing 11. The drum is rotatably supported by two exterior circular rails 12 and cooperating pairs of flanged rollers or trunnions 13. The two rollers 13, on each side of the drum, are secured to a shaft 14 extending through the insulated end walls of the housing 11 and mounted in bearings 15. The bearings 15 are mounted on a structural metal support frame 16.

The charging and discharging end 17 of the drum is generally conical in shape, and has a circular opening adapted to be closed by a removable door 18. The door has a small central port normally closed by a readily removable plug 19. The other end of the drum has a circular plate 20 firmly secured to the drum and to a hollow shaft 21. The shaft 21 passes through a guide bearing 22 in the end wall of the housing 11 and a main bearing 23 suitably mounted on the frame 16. A sprocket 24 is secured to the outer end of the shaft 21. An electric motor 25, mounted on a bracket 26 secured to the frame 16, is operatively connected through a chain drive 27 to a gear reduction 28. The last or low-speed pinion 29 of the gear reduction is connected by a chain 30 to the sprocket 24, to drive the drum 10 at about 3–4 R. P. M.

A pair of gas burners 31 are positioned below the rotary drum 10, and are appropriately supported in the insulation of the bottom of the housing 11. Each burner 31 is connected to the supply of fuel gas through a coupling 32 having a valve 33 for connecting and disconnecting its burner to the supply and for adjusting and controlling the amount of gas supplied to the burner. The insulated housing 11 has a stack 34, having a damper 35, for the exhaust of the heating gases.

The end of the housing adjacent the conical end 17 of the drum has a circular opening adapted to be closed by a door 36 having a hinge connection 37 with a bracket 38 secured to the frame 16. The door has a handle 36' and is adapted to be held closed by a sliding bolt 39 carried in apertured ears 40 of a bracket 41 secured to the frame 16.

Merely by way of example, a specific practice of the invention in the apparatus illustrated in the drawings will be described. With the doors 18 and 36 open, about 13 gallons of 42° Baumé (58% HNO₃) nitric acid are introduced into the drum 10. From 20 to 30 pounds of elemental mercury are then added to the drum. The door 18 is then closed tight, and the drum is rotated at 3 to 4 R. P. M. for 15 to 20 minutes. If no violent reaction occurs, which is indicated by the evolution of gas through the condenser (hereinafter described) rotation of the drum is stopped, and another 20 to 30 pounds of mercury is added. After this time interval, the heat of reaction will have raised the temperature of the drum contents to such a point that it no longer will rise. Rotation of the drum is again resumed. It is best at this stage to allow 15 to 20 minutes for rotation and observation. After the elapse of one-half to three-quarters of an hour since the first charge of mercury, the remainder of the mercury is added in one flask (76 pounds) lots, to a total of 4 flasks (304 pounds), this being the amount of mercury chemically required for reaction with the nitric acid to form mercurous nitrate.

After all the mercury has been added, a time interval is preferably allowed for the mercury and acid to mix thoroughly without the application of heat. After approximately 15 minutes, the gas burners 31 are lighted with the flame low until the reaction has steadied itself.

After the period allowed for leveling off or steadying, say about 1½ hours from the introduction of the initial lot of mercury, the time switches and the thermo-regulator are set and the equipment needs no further attention until near the completion of the process. When about 3½ hours have elapsed (from the start of the operation) it is desirable to open the small port in the door 18 (by removing the plug 19), to determine whether the gas has been thoroughly driven off. Any continued evolution of nitrogen oxides will be evidenced by the characteristic reddish-brown color of nitrogen dioxide (NO₂). Whatever nitric oxide (NO) is evolved within the drum is immediately oxidized to NO₂ on contact with the atmosphere. If the conversion is not completed, it may be necessary to allow another half hour or so to complete the operation.

The converted product is allowed to cool down in the drum for about one-half hour. The doors 18 and 36 may be opened during the cooling down period. The mercuric oxide is removed from the drum by a scoop or shovel, and the equipment is ready to repeat the operation.

In the first stage of the operation, the mercury reacts with the nitric acid to form mercurous nitrate, which clings or sticks to the interior cylindrical wall of the drum. This wall of the drum is preferably provided with a plurality of spaced longitudinal lifter bars 42 for lifting the mercury and agitating the mixture of acid and mercury. Ordinarily no external heating is used during the reaction of the mercury and nitric acid, the exothermic heat of reaction being sufficient to heat the mixture to a temperature of from 125–150° C. However, as the reaction nears completion, some slight heating may be desirable to assure completion of the reaction within the contemplated time interval of 1½ to 2 hours. The heating at this stage should not raise the temperature of the charge in the drum above about 150° C. It is only during the reaction of the mercury and acid that the process requires careful observation, to avoid too violent a reaction with possible loss of mercury. The completion of the reaction is determined by the elapsed time, and the gas burners are then turned on full and the time switches and thermo-regulator are set to control the subsequent conversion operation.

The mercurous nitrate reaction product forms a coating all around the cylindrical inner wall of the drum. The thickness of this coating depends upon the dimensions of the drum and the size of the charge, but may advantageously be about three-fourths of an inch. The coating remains in situ as formed and in the subsequent conversion becomes porous and granular as the gaseous nitrogen oxides are evolved. As a result, the mercuric oxide is obtained in a granular, crystalline form, easily removed from the drum and readily ground to the customary fineness of commercial red oxide of mercury. For example, the product removed from the drum is at least 50% and usually 60 to 90% through a 60 mesh standard Tyler screen. This may be ground to fall through a 325 mesh screen for marketing as pigment red oxide. The yellow oxide of mercury (and intermediate color grades) may be produced by further fine grinding of the red oxide.

In the equipment illustrated in Fig. 4 of the drawings for practicing the invention, the gases evolved during both the nitrating and conversion steps are conducted through a condensing chamber 43 to one or more packed absorption towers 44. The gases are conducted from the drum 10 through a pipe 45 positioned within the hollow shaft 21 and having a flexible connection 46 with the top of the chamber 43. A pipe 47 conveys the gases from near the bottom of the chamber 43 to the tower 44 beneath the packing therein. Sprays 48 deliver weak acid (or other liquid absorbing medium) above the packing in the tower. Preferably, the liquid absorbing medium is recirculated through the tower by an acid circulating pump 49. Fresh water, dilute acid, or other liquid absorbing medium may be added to the recirculating liquid through a valved pipe 50, and liquid may be withdrawn from the sump in the tower bottom through a valved pipe 51. The condensate in the chamber 43 is withdrawn through a valved pipe 52. The gases exhausted from the tower 44 through a pipe 53 may be passed to another similar tower and so on until discharged to the atmosphere or otherwise disposed of. By the use of several absorption towers in series, nitric acid of approximately 42° Bé. may be reclaimed from the nitrogen oxides evolved during the process. Whatever mercury is volatilized during the nitrating step as a result of too violent a reaction is condensed in the chamber 43 and recovered by withdrawal through the pipe 52.

During the conversion of the mercurous nitrate to mercuric oxide the temperature of the drum contents should not exceed 350° C., and is preferably between 300 and 350° C. This temperature may be advantageously maintained by regulating the supply of gas to the burners 31 by means of a thermo-regulator 55 connected to the valve 33. The thermo-regulator 55 is operatively connected to a thermo-couple or other suitable temperature responsive device 54 in the exhaust pipe 34 of the drum. The temperature of the exhaust heating gas is sufficiently representative of the temperature of the drum contents, with a standardized procedure in a particular apparatus, for the contemplated thermo-regulation of the conversion step. The coupling 32, in the gas supply, has another control valve 57, in advance of the valve 33, which is operatively connected to a time switch mechanism 58. By setting this mechanism for a predetermined time interval, the valve 57 will be closed and the supply of gas to the burner will be stopped after the elapse of that time interval. In practicing the invention, the mechanism 58 will be set to shut off the gas in a predetermined time interval (between 3½ to 4½ hours) after the first lot of mercury has been added to the nitric acid in the drum. Each of the burners 31 is provided with a time controlled valve 57—58, but the regulation of the temperature during conversion can usually be satisfactorily effected by providing only one of the burners with a thermo-controlled valve 33—55—54.

The advantages of the invention may be summarized as follows:

1. It is essentially a one-stage operation.
2. No loss of mercury by sublimation; consequently no danger of salivation to workmen and no loss of mercury.
3. 80 to 90% of the nitric acid is recovered for re-use.
4. The rotating drum avoids formation of the hard cake characteristic of the prior art practice. Porosity of the material during conversion results from even gas evolution, which in turn is the result of careful temperature control and timing.
5. A granular mercuric oxide product is directly obtained in the rotating drum.
6. Man hours required per unit poundage are approximately one-sixth that of the prior practice to produce a finished product ready for marketing.
7. Capital outlay for equipment to produce the same poundage in the same time is approximately one-fifth that of the prior practice.

I claim:

1. The method of making substantially granular mercuric oxide which comprises reacting a mixture of elemental mercury and nitric acid in a vessel rotatable about a substantially horizontal axis, rotating the vessel during the course of said reaction with the resulting production of mercurous nitrate in the form of a coating thereof on the interior surface of the vessel, and subsequently heating the rotating vessel to a temperature sufficiently high to effect decomposition of the mercurous nitrate while in situ in said coating with the resulting production of substantially granular mercuric oxide.

2. The method of making substantially granular mercuric oxide which comprises reacting a mixture of elemental mercury and nitric acid in a vessel rotatable about a substantially horizontal axis, rotating the vessel during the course of said reaction with the resulting production of mercurous nitrate in the form of a coating thereof on the interior surface of the vessel, effecting said reaction at a temperature not in excess of about 150° C. by intermittently adding small lots of the mercury to the entire amount of nitric acid in the vessel, and subsequently heating the rotating vessel to a temperature sufficiently high to effect decomposition of the mercurous nitrate while in situ in said coating with the resulting production of substantially granular mercuric oxide.

3. The method of making substantially granular mercuric oxide which comprises reacting a mixture of elemental mercury and nitric acid in a vessel rotatable about a substantially horizontal axle, rotating the vessel during the course of said reaction with the resulting production of mercurous nitrate in the form of a coating thereof on the interior surface of the vessel, effecting said reaction in the rotating vessel over a period of 1½ to 2 hours by intermittently adding small lots of the mercury to the entire amount of nitric acid in the vessel at such intervals as to prevent the development in the reaction mixture by the exothermic heat of reaction of a temperature in excess of about 150° C., and subsequently heating the rotating vessel to a temperature of 300–350° C. for a period of 2 to 3 hours to effect decomposition of the mercurous nitrate while in situ in said coating with the resulting production of substantially granular mercuric oxide of such fineness that at least 50% passes through a 60 mesh standard Tyler screen.

4. The method of making substantially granular mercuric oxide which comprises reacting a mixture of elemental mercury and nitric acid in a vessel rotatable about a substantially horizontal axis, rotating the vessel during the course of said reaction with the resulting production of mercurous nitrate in the form of a coating thereof on the interior surface of the vessel, subsequently heating the rotating vessel to a temperature sufficiently high to effect decomposition of the mercurous nitrate while in situ in said coating with the resulting production of substantially granular mercuric oxide, and subjecting the gaseous effluent from the reacting and heating operations to condensation for the recovery of mercury vapor and to absorption for the recovery of nitrogen oxide gases.

CLARENCE W. ROEN.

REFERENCES CITED

The following references are of record in the file of this patent:

UNITED STATES PATENTS

| Number | Name | Date |
| --- | --- | --- |
| 1,397,076 | Brusa | Nov. 15, 1921 |